US012246659B2

United States Patent
Houeix et al.

(10) Patent No.: US 12,246,659 B2
(45) Date of Patent: Mar. 11, 2025

(54) ASSEMBLY FOR FIXING AND POSITIONING DECORATIVE PROFILES OF A VEHICLE DOOR

(71) Applicant: Cooper-Standard France, Vitre (FR)

(72) Inventors: Serge Houeix, Rennes (FR); Gilles Riffaud, Rennes (FR)

(73) Assignee: Cooper-Standard France (FR)

( * ) Notice: Subject to any disclaimer, the term of this patent is extended or adjusted under 35 U.S.C. 154(b) by 337 days.

(21) Appl. No.: 17/970,291

(22) Filed: Oct. 20, 2022

(65) Prior Publication Data
US 2023/0126795 A1    Apr. 27, 2023

(30) Foreign Application Priority Data
Oct. 22, 2021 (FR) ........................................ 2111242

(51) Int. Cl.
*B60R 13/04* (2006.01)
*B60J 10/76* (2016.01)

(52) U.S. Cl.
CPC ............... *B60R 13/04* (2013.01); *B60J 10/76* (2016.02)

(58) Field of Classification Search
CPC ....... B60R 13/04; B60R 13/06; B60R 13/043; B60J 10/76; B60J 10/88; B60J 10/265; B60J 10/40; B60J 5/0402
USPC ......... 296/146.5, 149.9, 152, 1.08; 49/495.1, 49/441, 500.1, 479.1, 475.1; 52/716.5, 52/716.6; 428/31
See application file for complete search history.

(56) References Cited

U.S. PATENT DOCUMENTS 8,882,175 B2 * 11/2014 Drake .................... B60R 13/04
                                                                  296/146.5
11,485,209 B2 * 11/2022 James .................. B62D 29/008
(Continued)

FOREIGN PATENT DOCUMENTS

| DE | 4314123 A1 * | 11/1994 | ............ B60J 10/265 |
| FR | 3049510 A1 | 10/2017 | |
| WO | 2021089701 A1 | 5/2021 | |

OTHER PUBLICATIONS

French Preliminary Search Report for Application No. FR2111242 dated May 25, 2022, 2 pages. [See p. 1, categorizing the cited references].

*Primary Examiner* — Amy R Weisberg
*Assistant Examiner* — Wenwei Zhuo
(74) *Attorney, Agent, or Firm* — Lerner David LLP

(57) ABSTRACT

An assembly is provided for fixing and positioning a decorative side profile and a decorative upper profile on the outside of a front or rear door of a motor vehicle, wherein the decorative upper profile includes two longitudinal rims curved towards each other. The assembly includes a trim profile for the doorframe and a sealing profile made of deformable material, fixed to the trim profile, and on which the decorative upper profile is fixed.

A blocking part made of rigid material is fixed on the trim profile, and includes a portion for fixing the decorative side profile, a portion for axially and transversely blocking the decorative upper profile and a connecting portion between these two portions. The blocking portion includes an axial groove for receiving a section of one of the rims of the upper profile, which is obturated at one of its ends by an axial stop which cooperates with the upper profile received in this groove, to block the axial displacement of the upper profile.

8 Claims, 8 Drawing Sheets

(56) References Cited

U.S. PATENT DOCUMENTS

| | | | |
|---|---|---|---|
| 2013/0292964 A1* | 11/2013 | Maass | B60J 5/0402 49/482.1 |
| 2017/0057428 A1* | 3/2017 | Maliskey | B60J 5/0468 |
| 2021/0229539 A1* | 7/2021 | Morihara | B60J 10/76 |

* cited by examiner

[Fig. 1]
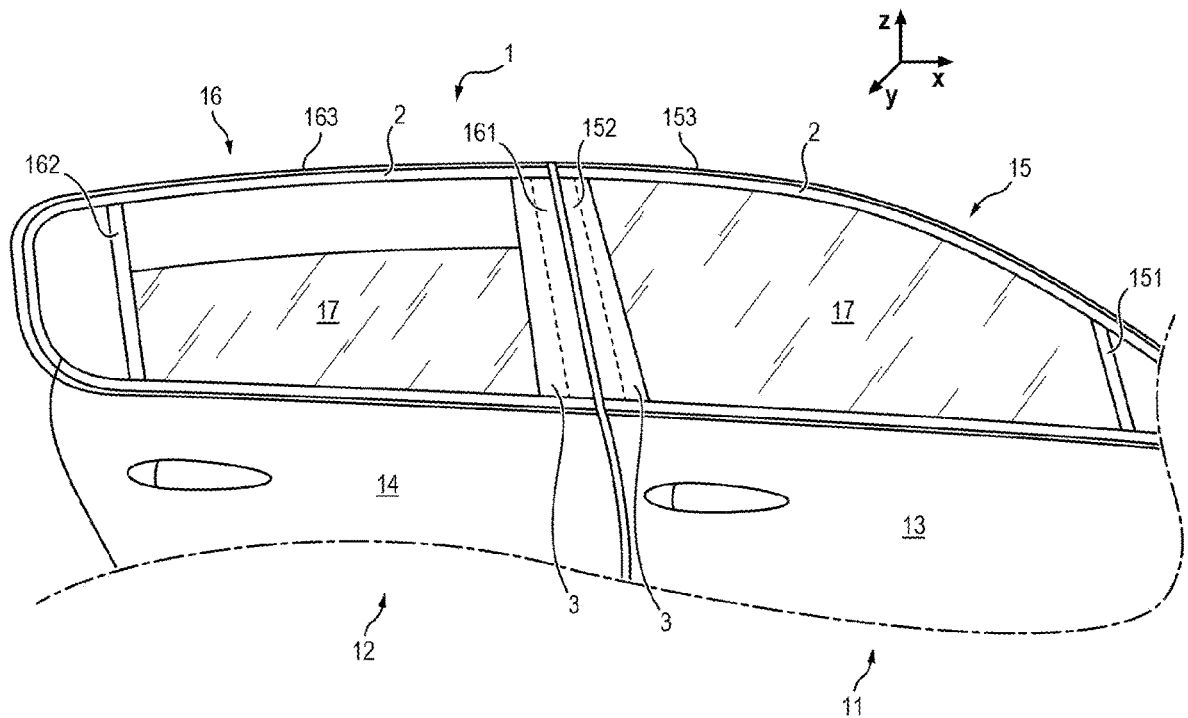
[Fig. 2]
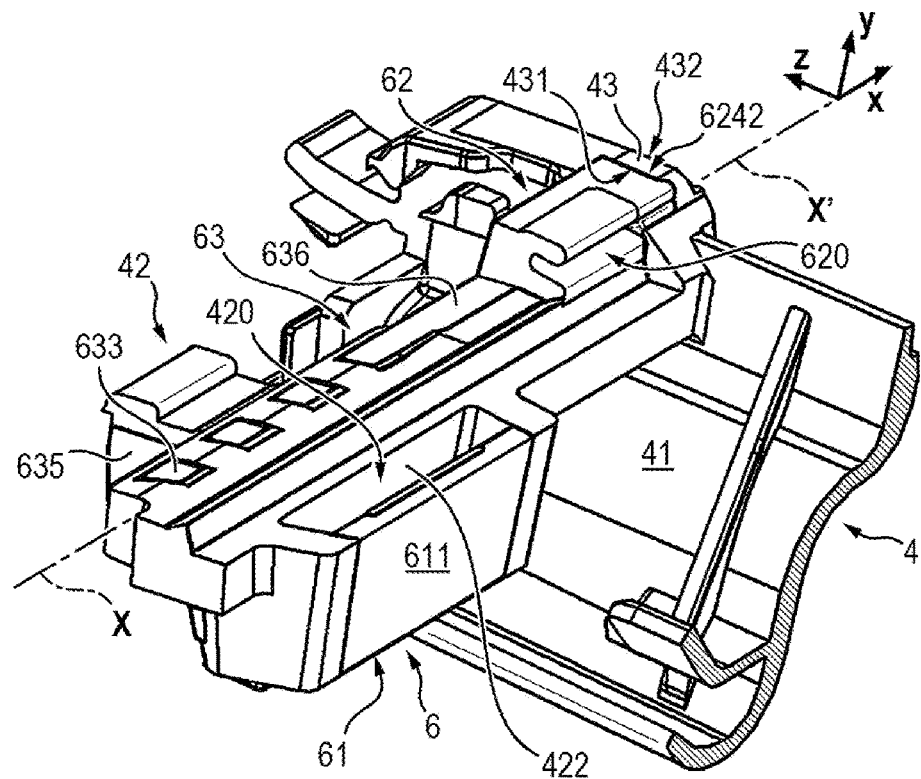

[Fig. 3]
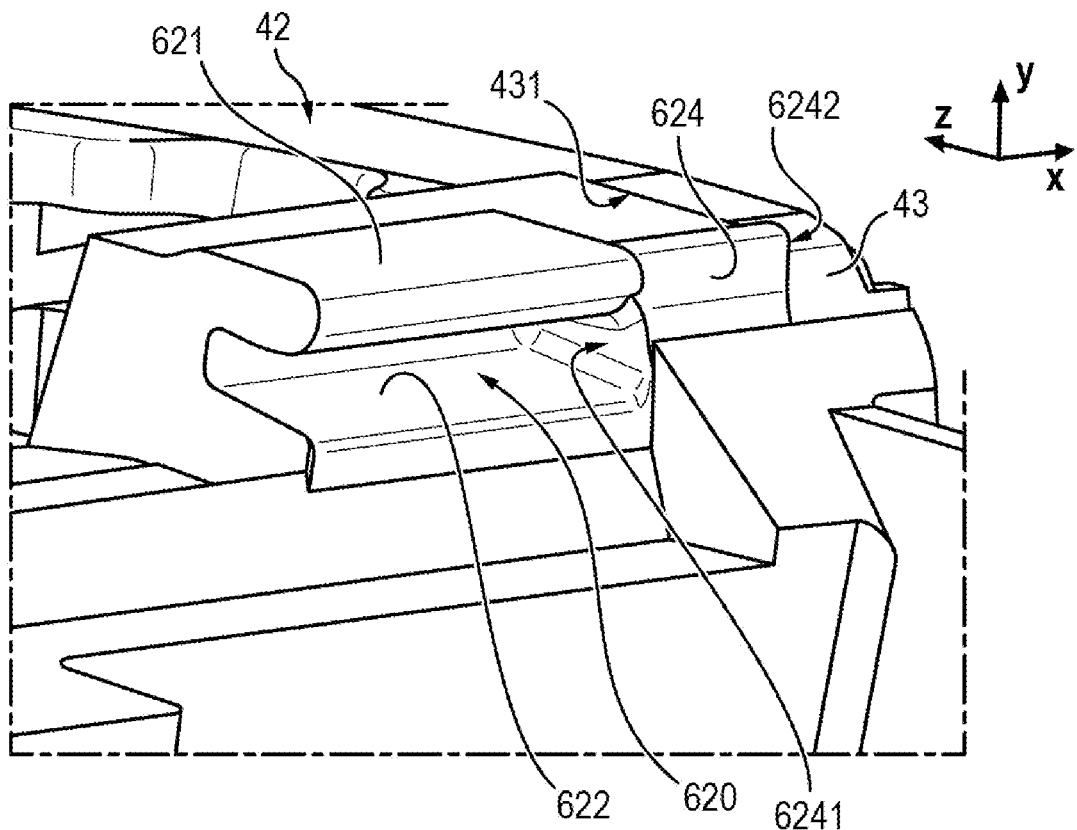
[Fig. 4]
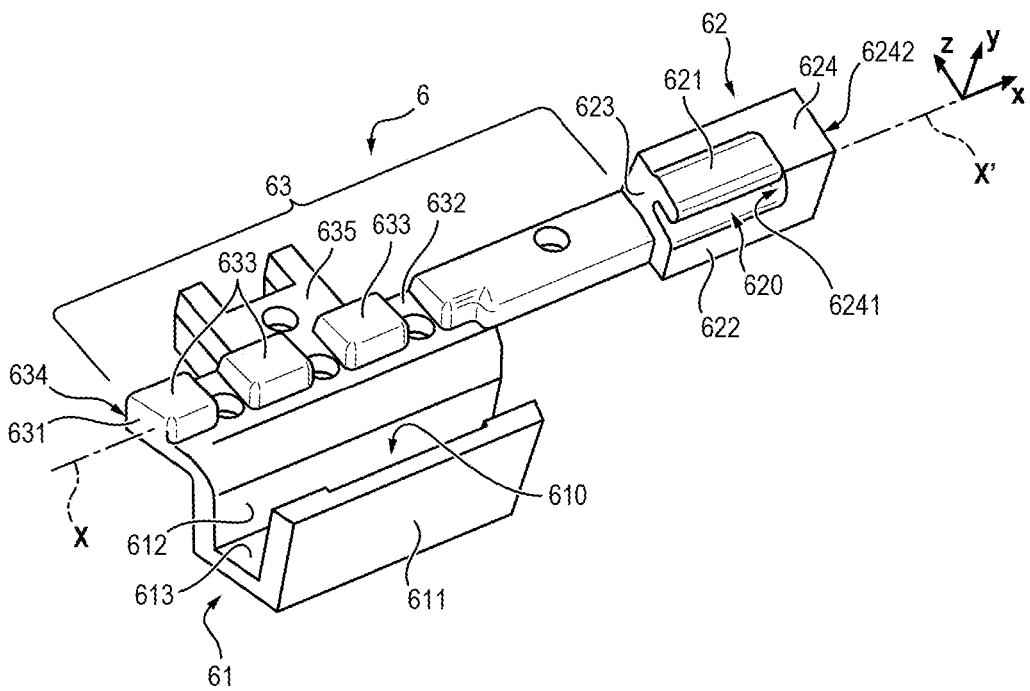

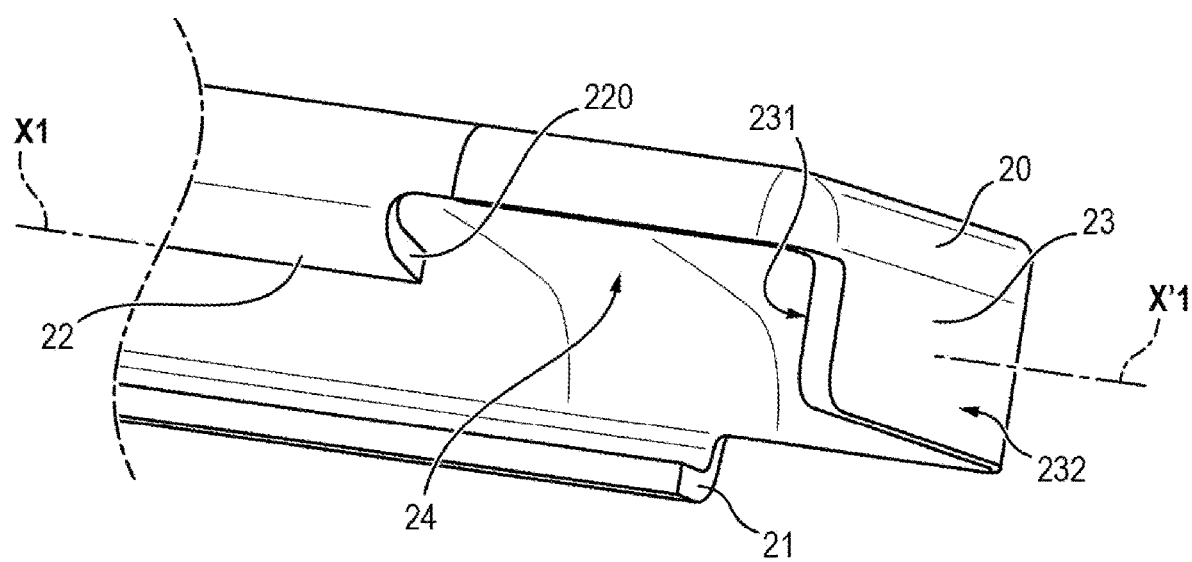
[Fig. 5]

[Fig. 6]
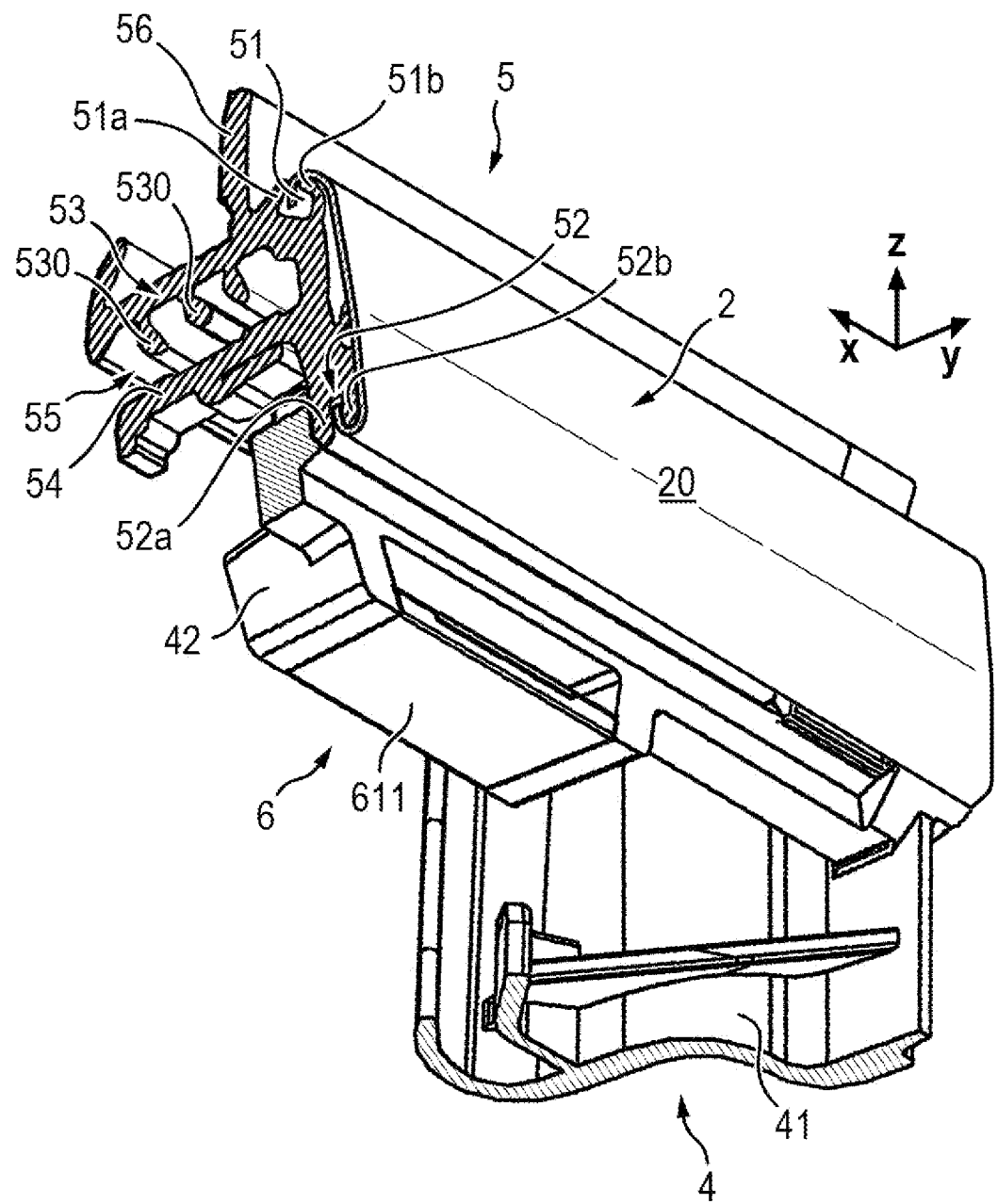

[Fig. 7]
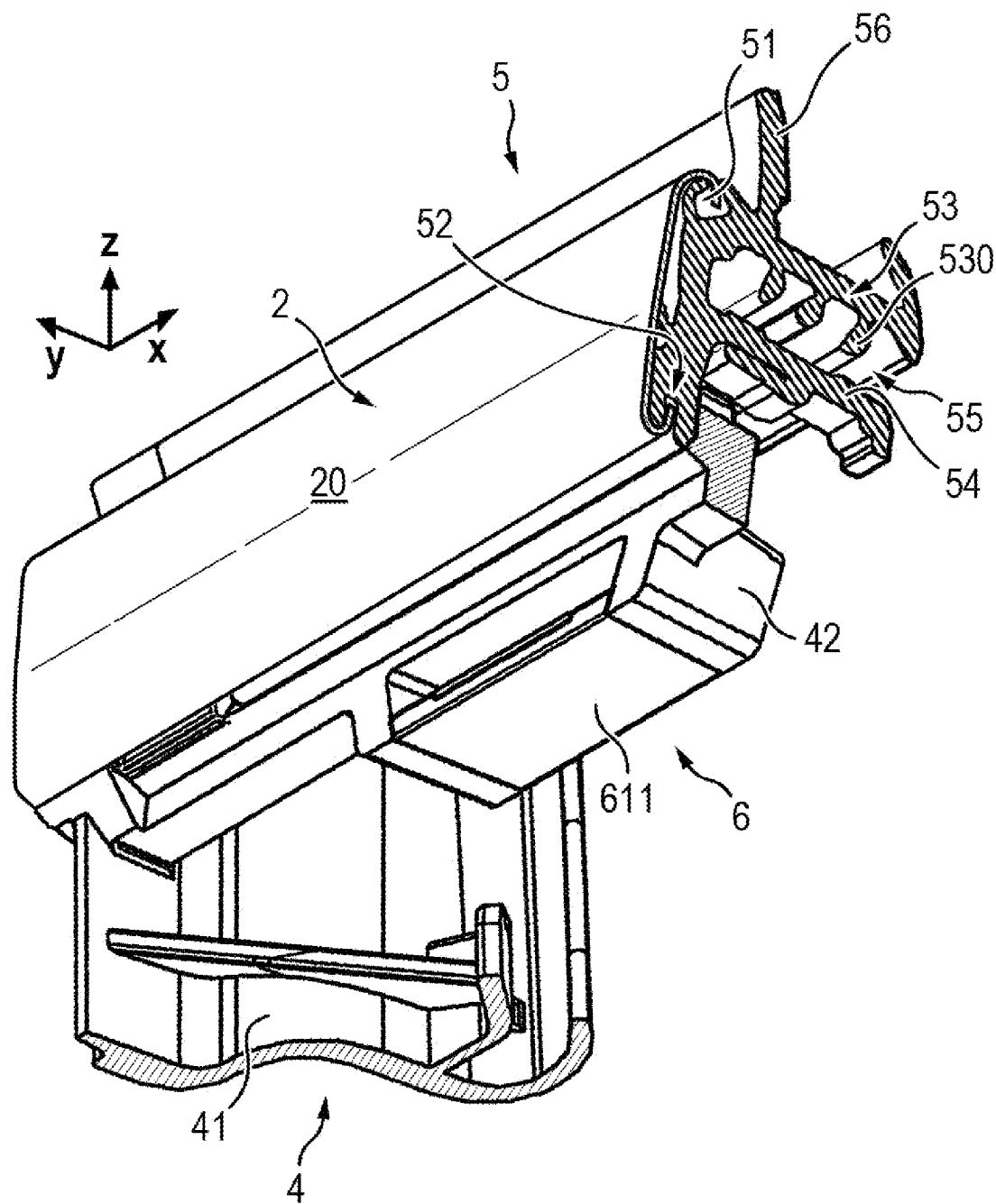

[Fig. 8]
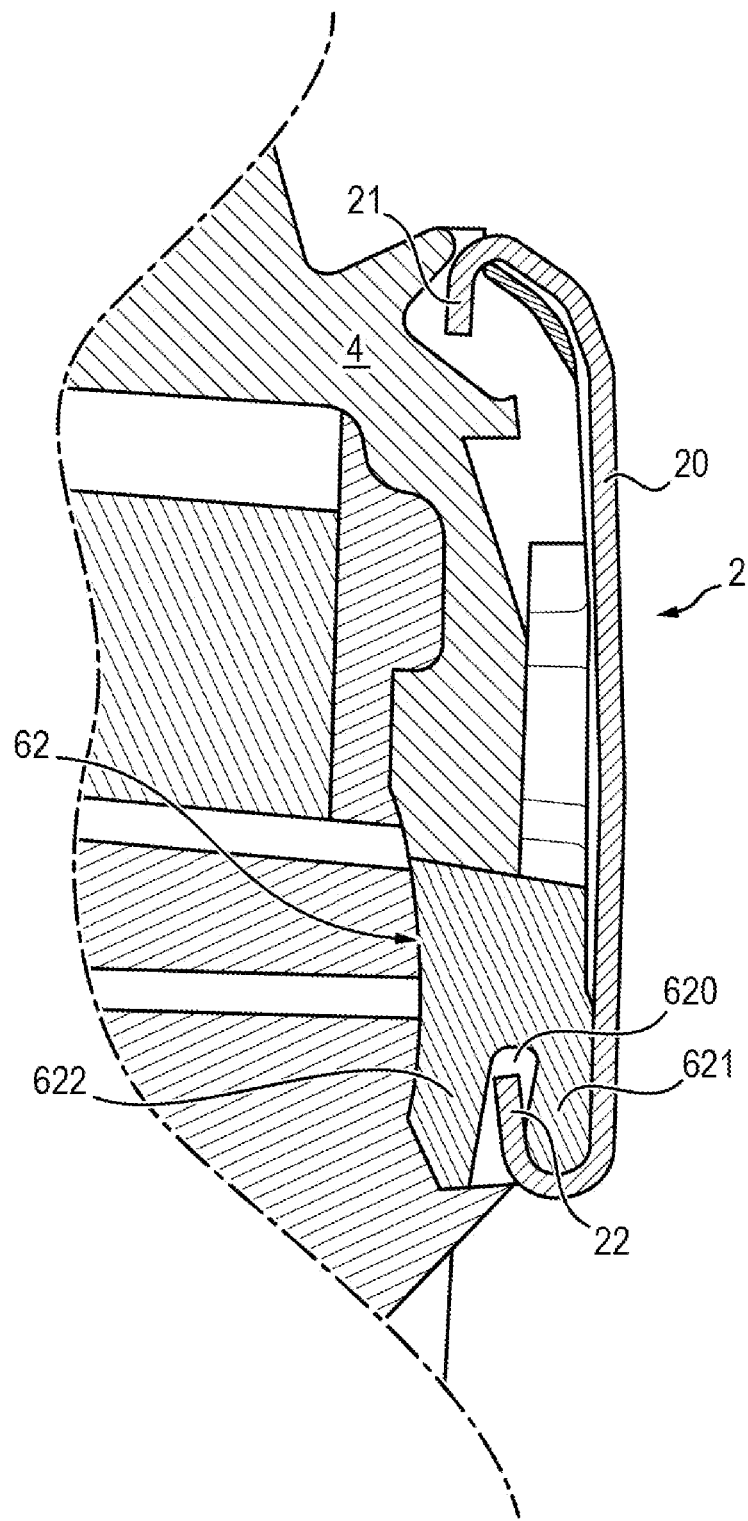

[Fig. 9]
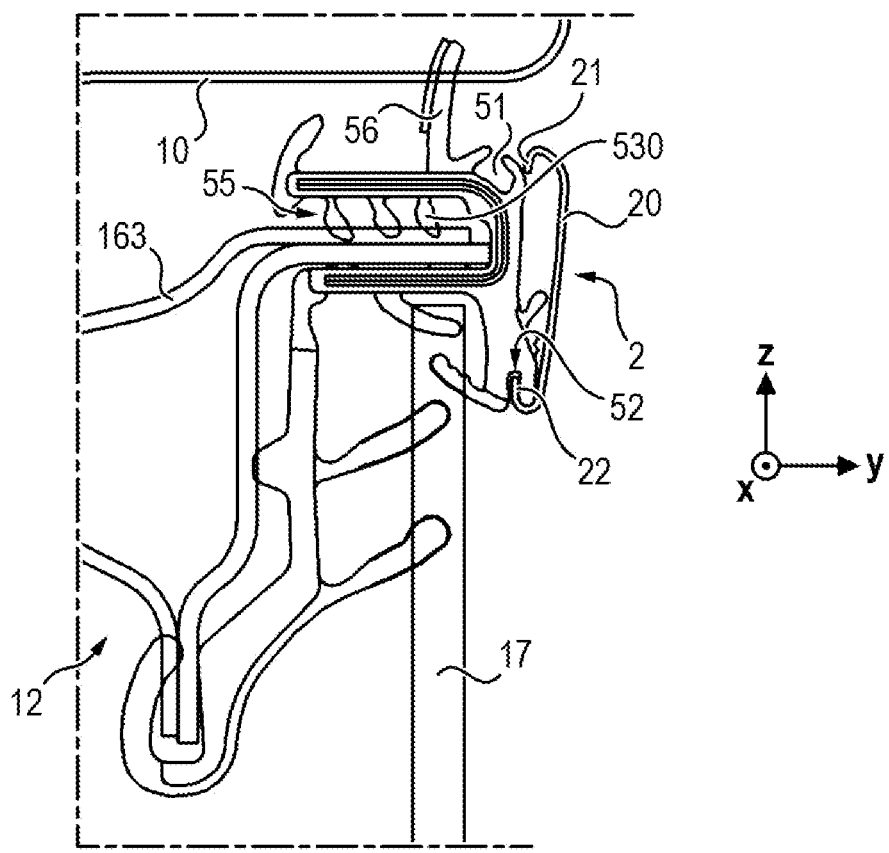
[Fig. 10]
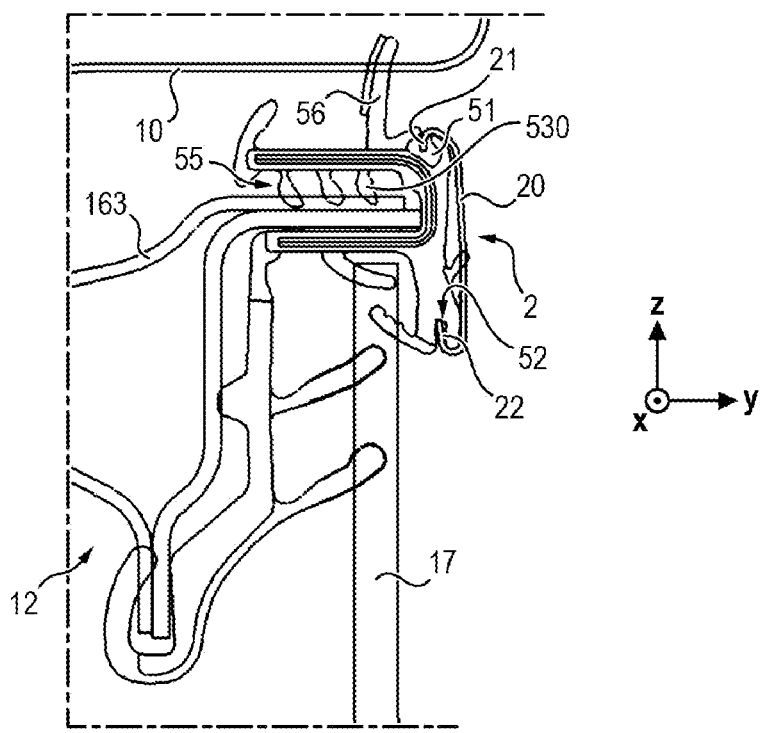

ASSEMBLY FOR FIXING AND POSITIONING DECORATIVE PROFILES OF A VEHICLE DOOR

FIELD OF THE INVENTION

The invention lies in the field of motor vehicles.

The present invention relates to a device for fixing and positioning a decorative side profile and a decorative upper profile on the outside of a front door or a rear door of a motor vehicle, a motor vehicle door equipped with such a device and a motor vehicle comprising such a door.

STATE OF THE ART

A motor vehicle whose front and/or rear doors are provided with external decorative profiles is already known from the state of the art.

More specifically, the door comprises a box which is extended at its upper portion by a frame which surrounds the pane of the door. This frame comprises a front upright and a rear upright, interconnected at their upper portion by a crosspiece. A decorative profile called decorative "upper" profile is fixed on this crosspiece in order to embellish the external appearance of the door and a decorative profile called decorative "side" profile is fixed on one of the uprights also for decorative purposes.

According to this state of the art, a trim profile made of flexible material and a door seal are assembled on the metal frame of the door. The decorative upper profile is held axially on this trim profile in order to prevent its displacement towards the front and towards the rear of the door.

However, as the trim profile is made of flexible material, it can be deformed and the precise positioning of the decorative upper profile is no longer ensured. It thus happens that the decorative upper profile is in a position where it is slightly protruding relative to the edge of the vehicle door.

Furthermore, the decorative upper profile and the decorative side profile are not fixed relative to each other and may shift after a certain number of opening and closing manipulations of the door.

DISCLOSURE OF THE INVENTION

The invention aims at overcoming the aforementioned drawbacks and proposing an assembly that allows fixing and positioning a decorative side profile and a decorative upper profile on the outside of a motor vehicle door, in a reliable manner, so as to prevent these profiles from shifting relative to each other and relative to the door as the latter is used.

To this end, the invention relates to an assembly for fixing and positioning a decorative side profile and a decorative upper profile on the outside of a front door or a rear door of a motor vehicle, said door comprising a box extended at its upper portion by a frame that surrounds a pane of the door, this frame comprising a front upright and a rear upright, interconnected at their upper portion by a crosspiece, the decorative upper profile comprising a longitudinal panel whose two upper and lower longitudinal rims respectively are curved towards each other, this fixing and positioning assembly comprising a trim profile for the frame of the door, configured to be able to be fixed on this frame and a sealing profile made of deformable material, assembled with said trim profile and configured to be able to be disposed facing the crosspiece of the door frame, this sealing profile comprising an upper longitudinal groove and a lower longitudinal groove for receiving respectively the upper longitudinal rim and the lower longitudinal rim of said decorative upper profile.

In accordance with the invention, this assembly comprises a blocking part made of rigid material, this blocking part is assembled with said trim profile, this blocking part comprises a portion for fixing the decorative side profile, a portion for blocking the decorative upper profile along the axial and transverse directions of the vehicle and a connecting portion between said fixing portion and said blocking portion and the blocking portion comprises an axial groove for receiving a length section of one of the longitudinal rims of the decorative upper profile, this groove being obturated at one of its ends by an axial stop which cooperates with one of the ends of one of the longitudinal rims of the decorative upper profile received in said receiving groove, to block the axial displacement of this decorative upper profile towards the front of the rear door or towards the rear of the front door of the motor vehicle when said blocking part is positioned respectively on the rear door or on the front door.

Thanks to these characteristics of the invention and in particular to the use of the blocking part, the decorative upper profile and the decorative side profile are fixed relative to each other. Furthermore, the blocking part also allows simultaneously fixing the decorative upper profile along the axial direction and along the transverse direction of the vehicle.

According to other advantageous and non-limiting characteristics of the invention, taken alone or in combination:
- the groove for receiving the blocking portion is open towards the bottom of the vehicle door so as to receive a length section of the lower longitudinal rim of the decorative upper profile and in that the end of the lower longitudinal rim of the decorative upper profile is in contact with the axial stop of the blocking portion of the blocking part;
- the blocking part is assembled with said trim profile such that the outer face of the axial stop of this blocking part is in contact with one of the two opposite faces of an end stop of the trim profile, in that the decorative upper profile comprises an end wall and in that the decorative upper profile is positioned relative to said blocking part such that the inner face of this end wall is in contact with the other of the two opposite faces of said end stop, so as to block the axial displacement of the decorative upper profile towards the rear of the rear door or towards the front of the front door of the motor vehicle;
- the portion for fixing the decorative side profile of the blocking part comprises an axial chute opening out towards the outside of the door of the motor vehicle, this axial chute being configured to receive an indexing lug of said decorative side profile;
- the blocking part and the trim profile are assembled with each other by overmolding the trim profile on the blocking part;
- the portion for fixing the decorative side profile of the blocking part comprises an axial chute opening out towards the outside of the motor vehicle door, in that the connecting portion of the blocking part comprises a longitudinal plate, which extends along the upper side of the upper side wall of said axial chute and which is integral with the latter and a longitudinal strip which extends from said longitudinal plate and which is integral with the portion for blocking the decorative upper profile.

The invention also relates to a motor vehicle front or rear door provided on its external side with a decorative side profile and a decorative upper profile, this door comprising a box extended at its upper portion by a frame that surrounds a pane of the door, this frame comprising a front upright and a rear upright, interconnected at their upper portion by a crosspiece, the decorative upper profile comprising a longitudinal panel whose two upper and lower longitudinal rims respectively are curved towards each other.

In accordance with the invention, this door comprises an assembly for fixing and positioning said decorative side profile and said decorative upper profile, as mentioned above.

The invention finally relates to a motor vehicle comprising a front door or a rear door as mentioned above.

DESCRIPTION OF THE FIGURES

Other characteristics, aims and advantages of the invention will emerge from the following description which is purely illustrative and not limiting and which should be read in relation to the appended drawings in which:

FIG. 1 is a schematic partial side view of a front door and a rear door of a motor vehicle.

FIG. 2 is a perspective view of the trim profile and of the blocking part of the fixing and positioning assembly in accordance with the invention.

FIG. 3 is a detail view of FIG. 2.

FIG. 4 is a perspective view of the blocking part of the fixing and positioning assembly in accordance with the invention.

FIG. 5 is a perspective view of the end of the decorative upper profile which is intended to be fixed using the fixing and positioning assembly in accordance with the invention.

FIG. 6 is a perspective view of a portion of the fixing and positioning assembly in accordance with the invention, intended to equip the upper front corner of the rear door of a motor vehicle.

FIG. 7 is a perspective view of a portion of the fixing and positioning assembly in accordance with the invention, intended to equip the upper rear corner of the front door of a motor vehicle.

FIG. 8 is a cross-sectional view of the decorative upper profile and of a portion of the assembly for fixing and positioning this decorative profile in accordance with the invention.

FIG. 9 is a diagram representing the position of the decorative upper profile during its fixing on the door of a motor vehicle.

FIG. 10 is a diagram representing the position of the decorative upper profile once fixed on the door of a motor vehicle.

DETAILED DESCRIPTION OF THE INVENTION

Figure 11:
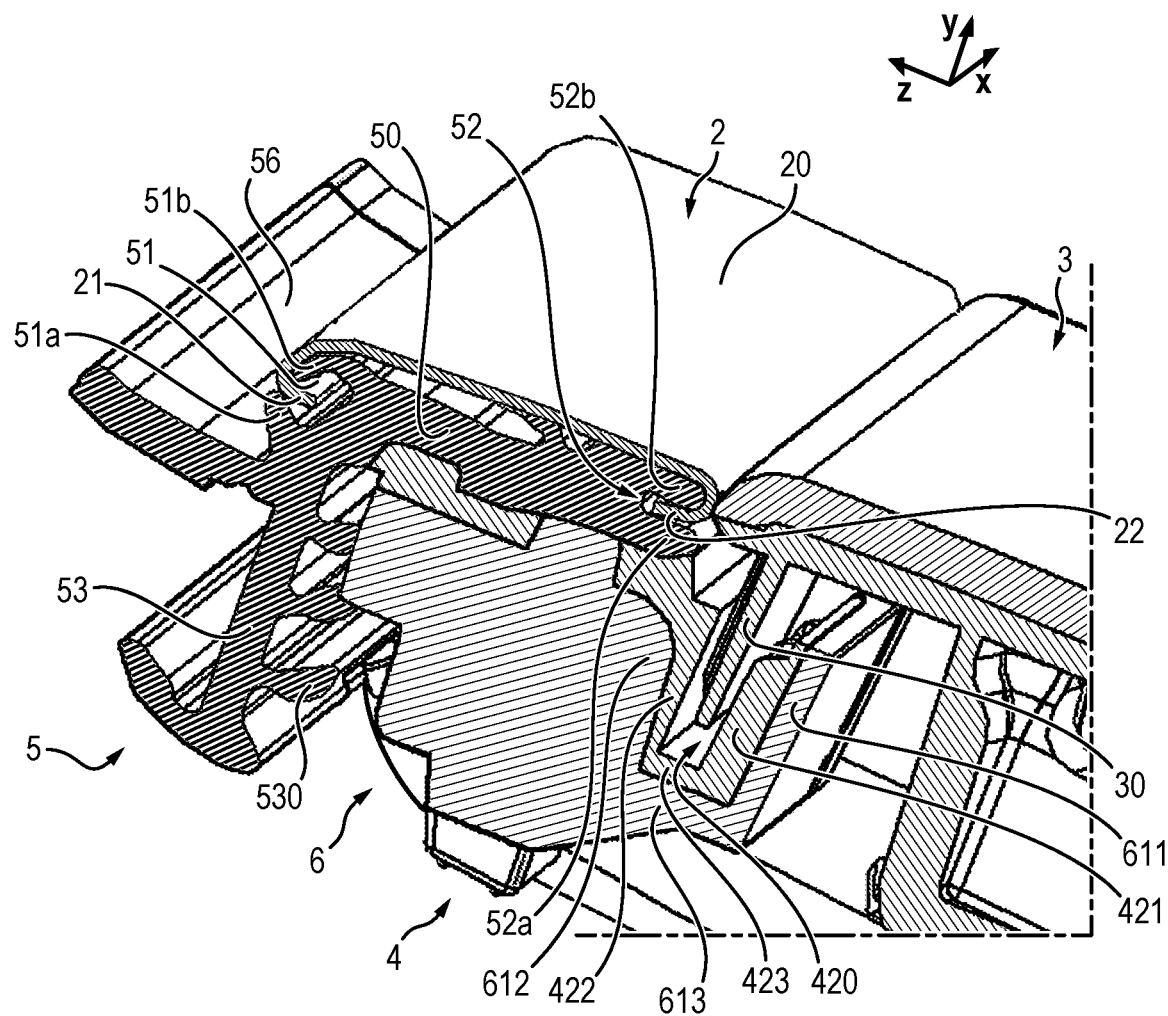
FIG. 11 is a perspective view representing a portion of the fixing and positioning assembly in accordance with the invention and a portion of the decorative upper profile and the decorative side profile.

Referring to the appended FIG. 1, a motor vehicle 1 which comprises a front door 11 and a rear door 12 can be seen. The front door 11, respectively the rear door 12, comprises a box 13, respectively 14, extended at its upper portion by a frame 15, respectively 16.

Each frame is intended to surround a generally sliding pane 17.

The frame 15 comprises a front upright 151 and a rear upright 152, interconnected at their upper portion by a crosspiece 153. Similarly, the frame 16 comprises a front upright 161, a rear upright 162 and a crosspiece 163.

Each door is also provided with a decorative upper profile 2 and a decorative side profile 3. The decorative upper profile 2 is intended, as its name indicates, to be fixed on the upper portion of the door, more specifically facing the crosspiece 153, 163 of the front door 11, respectively of the rear door 12. The decorative side profile 3 is intended to be fixed either on the rear upright 152 of the front door 11 or on the front upright 161 of the rear door 12.

In the rest of the description of the claims, the "axial" direction x designates the direction that extends along the longitudinal axis of the vehicle, the "transverse" direction y designates the direction that extends along the transverse axis of the vehicle and the "vertical" direction z corresponds to the vertical direction of the vehicle when the latter is bearing on its wheels, (see the three-dimensional reference frame in the figures).

The terms "internal" and "external" are to be taken into consideration relative to the interior or exterior of the vehicle 1 and the terms "upper" and "lower" relative to the position of the doors of the vehicle when the latter is bearing on its wheels.

The assembly for fixing and positioning the decorative upper profile 2 and the decorative side profile 3, in accordance with the invention, comprises a trim profile 4 for the door frame, a sealing profile 5 and a blocking part 6.

One exemplary embodiment of the trim profile 4 will now be described with reference to FIG. 2. This trim profile 4 is shaped to trim and cover the external face of the frame 15, 16 of the front door 11, respectively rear door 12.

The shape of the trim profile 4 may vary depending on the model of the motor vehicle and therefore on the model of the corresponding door to be trimmed. Furthermore, the shape of this trim profile is adapted depending on whether it comes to trimming the rear door 12 of the vehicle, as represented in FIG. 6 or the front door 11, as represented in FIG. 7.

In all cases and as can be seen in FIG. 2, the trim profile 4 comprises a trim portion 41 for the upright of the frame, here the front upright of the rear door frame and a trim portion 42 for the crosspiece of this frame. In FIGS. 6 and 7, it can thus be observed that these portions 41 and 42 are mirror-inverted. In FIGS. 2, 6 and 7, it can be seen that only the corner portion of the trim profile 4, located at the intersection between the crosspiece and the upright is represented.

As best seen in FIGS. 2 and 11, the trim profile 4 and more specifically the trim portion 42 further comprises a chute 420, formed of two side walls, namely a lower wall 421 and an upper wall 422, joined by a bottom 423.

The chute 420 opens out towards the outside of the vehicle door and when the trim profile 4 is in place on the door, the bottom 423 of the chute is vertical or substantially vertical.

Advantageously, this trim profile 4 is made of a flexible material, such as a thermoplastic elastomer or a vulcanized elastomer, for example.

The sealing profile 5 will now be described in more detail, in relation to FIG. 6.

The sealing profile 5 is intended to be fixed on the trim profile 4 for the door, so as to ensure the sealing of this door vis-à-vis the vehicle 1 body 10, when this door is closed. This closed position is represented in FIG. 9. When this profile 5 is in place, its longitudinal axis is parallel to the axial direction x of the vehicle.

The sealing profile 5 is made of a flexible material, such as a thermoplastic elastomer or a vulcanized elastomer, for example.

The sealing profile 5 comprises a longitudinal body 50 having the shape of a strip. This body 50 is provided, at its upper portion, with two lips, respectively an internal lip 51*a* and an external lip 51*b*, which together delimit a upper longitudinal groove 51. The body 50 is also provided, at its lower portion, with two lips, respectively an internal lip 52*a* and an external lip 52*b*, which together delimit a lower longitudinal groove 52.

In the exemplary embodiment represented in the figures, the sealing profile 5 also comprises two transverse tabs, respectively an upper longitudinal tab 53 and a lower longitudinal tab 54 which extend perpendicular or substantially perpendicular to the longitudinal body 50, so to provide therewith a U-shaped channel 55. Advantageously, this U-shaped channel 55 is internally provided with one or several internal lip(s) 530 which protrude inwardly from one of the longitudinal tabs, for example here from the upper longitudinal tab 53.

As best seen in FIG. 9, this U-shaped channel 55 allows receiving the crosspiece of the door frame, that is to say in the example represented in FIG. 9, the crosspiece 163 of the rear door 12 The lips 530 facilitate the blocking of the sealing profile 5 on this crosspiece.

Finally, advantageously the sealing profile 5 also comprises at least one longitudinal sealing lip 56, which extends parallel to the body 50 and outwardly from the upper longitudinal tab 53. When the profile 5 is in place on the door frame, this lip 56 ensures the sealing with the vehicle 1 body 10.

The sealing profile 5 could have a different shape to adapt to the particular shape of the door on which it is fixed but still has, in accordance with the invention, an upper longitudinal groove 51 and a lower longitudinal groove 52.

The blocking part 6 will now be described in more detail with reference to FIG. 4. It is made of a rigid material, for example a filled or non-filled rigid thermoplastic material such as a polyolefin or a polyamide.

The blocking part 6 extends along a longitudinal axis X-X'.

The blocking part 6 comprises three portions, namely a portion 61 for fixing the decorative side profile 3, a portion 62 for blocking the decorative upper profile 2 and a connecting portion 63, which connects the portions 61 and 62 to each other.

The fixing portion 61 comprises a chute 610, formed of two side walls, namely a lower wall 611 and an upper wall 612, joined by a bottom 613. This chute extends along an axis parallel to the longitudinal axis X-X'. When the blocking part 6 is positioned on the door, the bottom 613 is vertical or substantially vertical.

When the blocking part 6 is in place on the trim profile 4, as represented in FIGS. 2, 6 and 7, the chute 610 extends axially (along the direction x) and it is oriented so as to open out laterally and towards the outside of the door of the vehicle 1.

The connecting portion 63 comprises a section in the form of a longitudinal plate 631, which extends along the upper edge of the side wall 612, perpendicular or substantially perpendicular to the latter and which is secured thereto.

The plate 631 is advantageously provided on its face turned outward 632 with at least one pad 633, for example here three pads 633.

The plate 631 is also advantageously provided on its upper face 634 with at least one lug 635.

The plate 631 is extended at one of its ends by a longitudinal strip of material 636 which extends axially in the extension of the plate 631, (in other words along the longitudinal axis X-X').

The portion 62 for blocking the decorative profile 2 is located in the extension of the strip 636.

The portion 62 for blocking the decorative profile 2 comprises a groove 620 for receiving part of one of the longitudinal rims of said horizontal decorative profile 2 whose structure will be described later.

The axial groove 620 is delimited by two side walls, namely an external side wall 621 and an internal side wall 622, joined by a bottom 623. Preferably, the side wall 622 extends in the extension of the strip 636 and it is secured thereto.

Furthermore, the free end of the groove 620, (that is to say the one opposite to the end fixed to the strip 636) is obturated by an axial stop 624.

The axial stop 624 has two opposite faces, namely an inner face 6241, turned towards the groove 620 and an outer face 6242.

The different portions 61, 62 and 63 of the blocking part 6 are in one piece.

When the blocking part 6 is in place on the trim profile 4, as represented in FIGS. 2, 6 and 7, the groove 620 extends axially (along the direction x) and it is oriented so as to open out towards the bottom of the door of the vehicle 1.

As can be seen in FIGS. 2 and 11, advantageously, the trim profile 4 is overmolded onto the sealing profile 5 and onto the blocking part 6. Thus, the pads 633 and the strip 636 are embedded at least partly in the material constituting this profile 4. In addition, as can be seen in FIG. 11, the chute 420 of the profile 4 is inserted inside the chute 610 of the blocking part 6, so that its lower wall 421, its upper wall 422 and its bottom 423 are respectively in contact with the lower wall 611, the upper wall 612 and the bottom 613 of the fixing portion 61 of the blocking part 6.

The profile 4, the profile 5 and the blocking part 6 are thus secured (assembled) to each other.

Furthermore, the assembly of these parts is carried out so that on the one hand the chute 420 is accessible and allows receiving an indexing lug 30 which protrudes from the internal face of the decorative side profile 3, as represented in FIG. 11 and that on the other hand, the groove 620 is also accessible, as represented in FIGS. 2 and 3, to receive the decorative upper profile 2.

The rigid material of the blocking part 6 allows ensuring the correct vertical positioning (along the direction z) of the decorative side profile 3 and the chute 420 made of flexible material provides the elasticity necessary to pinch the lug 30 and ensure its holding.

Furthermore, advantageously, the trim profile 4 comprises an end stop 43, (see FIG. 2), disposed so as to come into contact with the outer face 6242 of the axial stop 624 of the portion 62 of the blocking part 6. More specifically, this stop 43 comprises two opposite faces, namely an inner face 431 oriented towards the door frame when the profile 4 is in place and an outer face 432 oriented towards the outside of the door frame.

When the profile 4 and the blocking part 6 are assembled, the faces 431, 432 of the stop 43 extend perpendicular to the longitudinal axis X-X'.

The decorative upper section 2 extends longitudinally along a longitudinal axis X1-X'1.

As best seen in FIGS. 7 and 8, this profile 2 comprises a thin longitudinal panel 20 whose two longitudinal rims are curved towards each other, so as to form an upper rim 21 and a lower rim 22, the terms "upper" and "lower" being designated relative to the position of the decorative profile 2 when the latter is placed on the door of the vehicle.

Furthermore, the decorative profile 2 has an end wall 23 perpendicular to the panel 20. This end wall 23 has two opposite faces, namely an inner face 231 turned inward and the hollow portion of the profile 2 and an outer face 232.

As best seen in FIG. 5, the end of the decorative upper profile 2, which is intended to be positioned at the corner between the crosspiece and the upright of the door frame, has a particular structure. In the vicinity of the wall 23, the rims 21 and 22 are broken. There is thus a notch 24 which extends between the end 220 of the lower rim 22 and the end wall 23.

The decorative upper profile 2 is positioned on the sealing profile 5 by clipping, as shown better in FIGS. 9 and 10. One of the longitudinal rims of the profile 2, for example the lower rim 22, is first inserted into the lower groove 52 of the sealing profile 5 (see FIG. 9), then the other rim, here the upper rim 21, is inserted into the upper groove 51 of the profile 5, (see FIG. 10).

Thus, when the decorative profile 2 is in place, its longitudinal axis X1-X'1 is parallel to the longitudinal axis X-X' of the blocking part 6.

In addition, as better seen in FIG. 8, a section of the length of the lower rim 22, which extends from the end 220 of this rim, is inserted into the groove 620 of the portion 62 of the blocking part 6. Thus, as this blocking part 6 is made of a rigid material, the decorative upper profile 2 is held along the transverse direction y, thanks to the side walls 621 and 622 and in the two opposite directions (that is to say to the right and to the left in FIG. 8).

In addition, the end 220 of the lower rim 22 of the decorative profile 2 comes into abutment against the inner face 6241 of the axial stop 624 of the blocking part 6 made of rigid material. Thus, the decorative upper profile 2 is also held along the axial direction x and cannot move towards the outside of the door (that is to say to the right of FIG. 4 or FIG. 6). More specifically, the profile 2 cannot thus move towards the front of the rear door 12 or towards the rear of the front door 11 depending on which door this profile 2 is mounted on.

Finally, advantageously, the decorative profile 2 is also positioned such that the inner face 231 of its end wall 23 is in contact with the outer face 432 of the stop 43 of the trim profile 4. Thus, the decorative upper profile 2 is also held along the axial direction x and cannot move towards the inside of the door, that is to say to the left of FIGS. 4 and 6. More specifically, the profile 2 cannot thus move towards the rear of the rear door 12 or towards the front of the front door 11 depending on which door this profile 2 is mounted on.

The decorative profile 2 is thus blocked in both directions along the axial direction x.

According to one variant embodiment not represented in the figures, the portion 62 and the decorative profile 2 can be shaped so that the groove 620 opens out upwards and that it is a section of the length of the upper rim 21 which is inserted into the groove 620.

The invention claimed is:

1. An assembly for fixing and positioning a decorative side profile and a decorative upper profile on an outside of a front door or a rear door of a motor vehicle,
the front door or the rear door comprising a box extended at an upper portion by a frame that surrounds a pane of the door, the frame comprising a front upright and a rear upright, interconnected at an upper portion of the front upright and an upper portion of the rear upright by a crosspiece,
the decorative upper profile comprising a longitudinal panel with an upper longitudinal rim and a lower longitudinal rim, the upper and the lower longitudinal rims being respectively curved towards each other, the upper longitudinal rim having two ends and the lower longitudinal rim having two ends,
the fixing and positioning assembly comprising a trim profile for the frame of the door, configured to be able to be fixed on this frame and a sealing profile made of deformable material, assembled with the trim profile and configured to be able to be disposed facing the crosspiece of the door frame, the sealing profile comprising an upper longitudinal groove and a lower longitudinal groove for receiving respectively the upper longitudinal rim and the lower longitudinal rim of the decorative upper profile,
wherein the assembly comprises a blocking part made of rigid material,
wherein this blocking part is assembled with the trim profile,
wherein the blocking part comprises a portion for fixing the decorative side profile, a blocking portion for blocking the decorative upper profile along axial and transverse directions of the motor vehicle and a connecting portion between the fixing portion and the blocking portion,
and wherein the blocking portion comprises an axial groove for receiving a length section of one of the longitudinal rims of the decorative upper profile, the axial groove having two ends and being obturated at one of the two ends of the axial groove by an axial stop which cooperates with one of the two ends of the upper longitudinal rim or with one of the two ends of the lower of the longitudinal rims of the decorative upper profile received in said receiving groove, to block an axial displacement of the decorative upper profile towards a front of the rear door or towards a rear of the front door of the motor vehicle when the blocking part is positioned respectively on the rear door or on the front door.

2. The assembly according to claim 1, wherein the groove for receiving the blocking portion is open towards a bottom of the vehicle door so as to receive a length section of the lower longitudinal rim of the decorative upper profile and wherein one end of the lower longitudinal rim of the decorative upper profile is in contact with the axial stop of the blocking portion of the blocking part.

3. The assembly according to claim 1, wherein the trim profile has an end stop provided with two opposite faces, wherein the blocking part is assembled with the trim profile such that an outer face of the axial stop of the blocking part is in contact with one of the two opposite faces of the end stop of the trim profile, wherein the decorative upper profile comprises an end wall and wherein the decorative upper profile is positioned relative to the blocking part such that an inner face of the end wall is in contact with the other of the two opposite faces of said of the end stop, so as to block an axial displacement of the decorative upper profile towards a rear of the rear door or towards a front of the front door of the motor vehicle.

4. The assembly according to claim 1, wherein the portion for fixing the decorative side profile of the blocking part comprises an axial chute opening out towards the outside of the front door or the outside of the rear door of the motor vehicle, the axial chute being configured to receive an indexing lug of the decorative side profile.

5. The assembly according to claim 1, wherein the blocking part and the trim profile are assembled with each other by overmolding the trim profile on the blocking part.

6. The assembly according to claim 1, wherein the portion for fixing the decorative side profile of the blocking part comprises an axial chute opening out towards the outside of the front door or rear door of the motor vehicle, wherein the connecting portion of the blocking part comprises a longitudinal plate, which extends along an upper side of an upper side wall of the axial chute and which is integral with the axial chute and a longitudinal strip which extends from the longitudinal plate and which is integral with the blocking portion for blocking the decorative upper profile.

7. A motor vehicle front door or rear door provided on an external side with a decorative side profile and a decorative upper profile, the front door or the rear door comprising a box extended at an upper portion by a frame that surrounds a pane of the door, the frame comprising a front upright and a rear upright, interconnected at an upper portion of the front upright and an upper portion of the rear upright by a crosspiece, the decorative upper profile comprising a longitudinal panel with an upper longitudinal rim and a lower longitudinal rim, the upper and the lower longitudinal rims being respectively curved towards each other, wherein the front door or the rear door comprises an assembly for fixing and positioning said decorative side profile and said decorative upper profile according to claim 1.

8. A motor vehicle wherein the motor vehicle comprises a front door and/or a rear door according to claim 7.

* * * * *